United States Patent [19]

Balaban et al.

[11] 4,385,264

[45] May 24, 1983

[54] START-UP CIRCUIT FOR A POWER SUPPLY

[75] Inventors: Alvin R. Balaban, Lebanon; Steven A. Steckler, Clark, both of N.J.

[73] Assignee: RCA Corporation, New York, N.Y.

[21] Appl. No.: 261,361

[22] Filed: May 7, 1981

[51] Int. Cl.³ .................................................. H01J 29/70
[52] U.S. Cl. ........................................ 315/411; 358/190
[58] Field of Search ......................... 315/411; 358/190; 363/49

[56] References Cited

U.S. PATENT DOCUMENTS

| | | | |
|---|---|---|---|
| 3,688,154 | 8/1972 | Christopher | 315/27 |
| 3,876,910 | 8/1975 | Kraus | 317/31 |
| 3,891,892 | 6/1975 | Bohringer | 315/411 |
| 4,188,568 | 2/1980 | Manners | 315/411 |
| 4,246,634 | 1/1981 | Purol | 363/49 |
| 4,898,525 | 8/1975 | Steckler | 315/411 |

*Primary Examiner*—Theodore M. Blum
*Attorney, Agent, or Firm*—Paul J. Rasmussen; William H. Meise; Scott J. Stevens

[57] ABSTRACT

A start-up circuit for a power supply used in a television receiver controls the operation of the power supply during a start-up interval. The power supply is disabled by the start-up circuit at a first voltage level until a capacitor is charged to a predetermined second voltage level. The power supply is then enabled, disabling the start-up circuit, and discharging the capacitor. The power supply continues to operate until the capacitor is discharged below an intermediate voltage level at which point the power supply is disabled and the start-up circuit again becomes operative to allow the capacitor to recharge.

11 Claims, 1 Drawing Figure

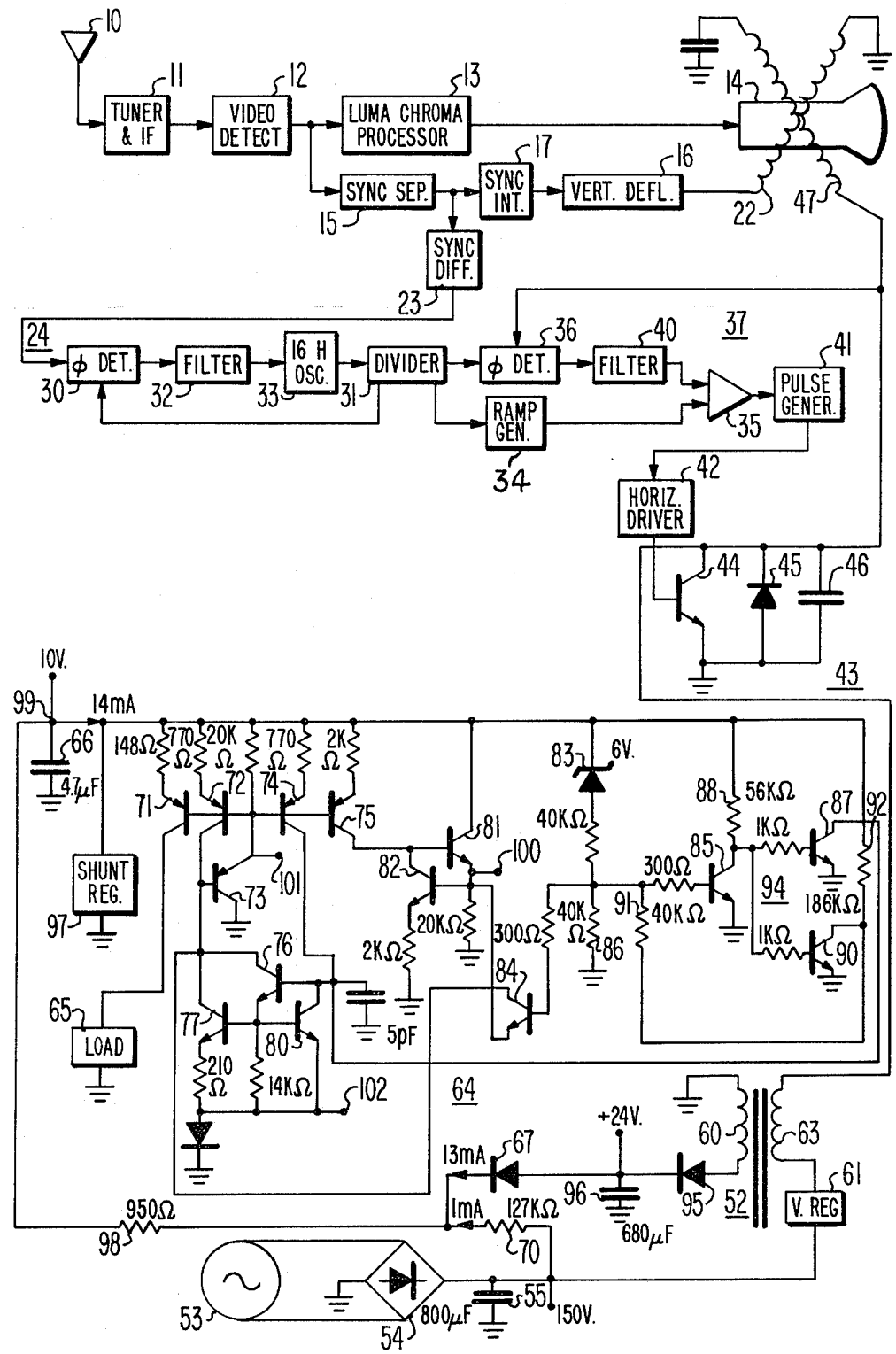

START-UP CIRCUIT FOR A POWER SUPPLY

This invention relates to a television receiver power supply start-up circuit which controls the operation of the power supply during energization to avoid excessive power dissipation during steady state operation.

In a television receiver, deflection circuits generate horizontal deflection signals at a line rate and vertical deflection signals at a field rate which are applied to respective horizontal and vertical output circuits. These output circuits in turn cause sawtooth currents to flow through the coils of the deflection yoke, thereby creating appropriate electromagnetic fields within the yoke to deflect electron beams across the display screen of a picture tube.

The previously described deflection circuits, as well as other receiver circuitry, may normally be powered by a regulated power supply which derives its output from horizontal rate energy generated by the horizontal deflection output circuit. When the receiver is turned on, the flyback pulses from which the deflection circuit normal operating power is derived are not present. The power supply for the deflection circuits, therefore, may be initially powered from the unregulated or raw B+ power supply derived from the AC line until flyback pulses of sufficient amplitude to sustain circuit operation are produced.

During receiver start-up, deflection circuit power supply current may be obtained directly from the unregulated B+ supply via a low value resistor. This start-up current may be substantial, requiring a relatively high wattage expensive resistor. In particular, if it is desired that normal start-up occurs with low B+ supply voltage, the resistor power dissipation when the B+ supply voltage increases to normal levels will be very high, resulting in unnecessary receiver power consumption.

An alternate start-up approach utilizes a capacitor which is charged from the unregulated B+ supply via a high value resistor. The capacitor then provides sufficient current to the power supply to energize its associated load circuits until the operation-sustaining flyback pulses are produced. A problem with this technique occurs when the power supply and associated load circuits begin operating and discharging the capacitor before the capacitor is sufficiently charged. This may cause the capacitor to become discharged before flyback pulses of sufficient amplitude are produced. Under these conditions, normal receiver operation may never be achieved.

U.S. Pat. No. 3,898,525 discloses a deflection circuit power supply which initially limits current drawn from a supply capacitor but the circuit shown is intended to prevent damage to the deflection circuit due to insufficient current and not to allow development of a steady state voltage supply. A copending U.S. application, Ser. No. 186,789, in the name of Luz also illustrates a start-up circuit which permits a capacitor to charge to a predetermined voltage level before discharging it. This start-up circuit operates as an on-off switch for the load circuits, which draw current from the capacitor.

The present invention provides a start-up circuit which controls a plurality of power supply current sources which supply current to television receiver load circuits until a capacitor is sufficiently charged to provide the necessary load start-up current. In the event the capacitor is discharged before normal operation is achieved, the power supply current sources are disabled, the start-up circuit is reenabled and the capacitor is allowed to charge again.

In accordance with another aspect of the present invention, for use in a television receiver having a power supply for energizing a load circuit, a capacitor coupled to the power supply and supplying current thereto, and a first current source for charging the capacitor, a power supply start-up circuit comprises means responsive to the turning on of the receiver for establishing a first voltage level. Means are responsive to the first voltage level for initially disabling the power supply to allow the capacitor to charge from the current source to a second voltage level. Means are responsive to the attainment of the second voltage level for enabling the power supply to energize the load circuit. The power supply, when enabled, draws current from the capacitor and discharges it. Means are responsive to a voltage level intermediate the first and second voltage levels for disabling the power supply when the capacitor discharges to the intermediate voltage level to allow the capacitor to recharge. Means are provided which are responsive to the energization of the load circuit for developing a steady state voltage across the capacitor to prevent the capacitor from discharging to the intermediate voltage level.

The accompanying drawing illustrates, in block and schematic form, a portion of a television receiver incorporating the start-up circuit of the present invention.

The television receiver shown in the drawing includes an antenna 10 which applies radio frequency signals to the tuner and intermediate frequency circuitry 11 of the receiver. I.F. signals are applied to a video detector 12, which produces a composite video signal. The video information of the composite video signal is processed by luminance and chrominance processing circuitry 13, which applies video drive signals to a kinescope 14.

The composite video signal is also supplied to a sync separator 15, which separates the horizontal and vertical sync signals from the video information. This composite sync signal is applied to a vertical deflection circuit 16 by way of a sync integrator 17. The sync integrator 17 supplies integrated vertical sync pulses to the vertical deflection circuit to establish the timing of vertical deflection waveforms which are applied to a vertical deflection winding 22 on the kinescope.

A sync differentiator 23 separates horizontal sync information from the composite sync signal and provides horizontal sync signals to the first loop 24 of a horizontal AFPC system. The horizontal sync signals are applied to one input of a first phase detector 30. The first phase detector 30 also receives an output signal at the horizontal deflection frequency from a divider 31 at a second input. The output signal resulting from a phase comparison of these two signals is filtered by a filter 32 and applied as a control signal to a 16H oscillator 33, having a nominal frequency which is sixteen times the desired horizontal scanning frequency. The oscillator 33 produces an output signal which is applied to the divider 31.

The divider 31 divides the oscillator output signal by sixteen to produce an output signal at the fundamental horizontal frequency for the first phase detector 30.

Another output of divider 31 is coupled to the input of a ramp generator 34, the output of which is coupled to the input of a comparison circuit 35. A third divider output is coupled to one input of a second phase detector 36 of a second AFPC loop 37.

The output of the second phase detector 36 is filtered by a filter 40 and the filtered output signal is applied to a second input of comparison circuit 35. The output of the comparison circuit 35 is coupled to a pulse generator 41, the output of which supplies a fixed duration horizontal deflection drive signal to a horizontal driver circuit 42. The horizontal driver circuit 42 supplies horizontal deflection drive waveforms to a horizontal deflection output circuit 43. Output circuit 43 includes an output transistor 44 coupled in parallel with a damper diode 45 and a retrace capacitor 46. Output circuit 43 supplies deflection current to winding 47 on the kinescope 14, and develops flyback pulses for the second phase detector 36. The output of phase detector 36 is a signal representative of the time difference between the horizontal retrace pulse and the pulse from divider 31 which is locked to the incoming horizontal sync pulses.

During normal receiver operation, comparator 35 compares a recurrent horizontal rate ramp voltage from ramp generator 34, with a dc voltage from filter 40. Comparator 35 generates a trigger pulse output resulting from the intersection of the ramp and the dc voltage. The time of intersection may vary from line to line in order to maintain proper phase synchronism between the flyback pulses and the horizontal synchronizing pulses for proper horizontal centering of the scanned television raster.

The presence of trigger pulses at the input of pulse generator 41 causes pulse generator 41 to produce an output which is applied to horizontal driver circuit 42. Other suitable circuits may be used to provide appropriate switching voltages or pulses to the horizontal driver circuit 42.

An ac line source 53 provides a voltage which is rectified by a diode bridge 54 and charges a filter capacitor 55 to develop a raw or unregulated B+ voltage. The rectified ac line voltage is applied to an input of a B+ regulator circuit 61. The output of regulator circuit 61 is the regulated B+ voltage which, for one use, is applied through the primary winding 63 of a transformer 52 to horizontal output circuit 43.

The receiver of FIG. 1 also comprises a power supply circuit 64 which supplies current to various load circuits including load circuit 65. A shunt regulator circuit 97 is coupled in parallel with capacitor 66. During normal receiver operation, power supply 64 draws current from a capacitor 66 and from a regulated voltage source, for example 10 volts, at a terminal 99. The regulated voltage source comprises a secondary winding 60 of transformer 52, a diode 95, a filter capacitor 96. The regulated voltage at the cathode of diode 95, for example +24 volts, is applied via a diode 67 and a resistor 98 to terminal 99 of power supply 64. When the receiver is first energized, however, capacitor 66 is in a discharged state and windings 60 are not energized. As previously described, start-up current for power supply 64 and hence the receiver load circuits operating therefrom, is provided by the unregulated B+ supply via a resistor 70 and resistor 98. The current drawn from the raw B+ supply, approximately 1 mA, charges capacitor 66. In accordance with an illustrative embodiment of the present invention, power supply 64 incorporates start-up circuitry 94, which operates until capacitor 66 has been sufficiently charged to supply current to operate supply 64 and its associated receiver load circuitry until winding 60 becomes energized.

In the circuit shown in FIG. 1, capacitor 66 is coupled to the emitters of transistors 71, 72, 73, 74 and 75. The bases of transistors 71, 72, 74 and 75 are coupled together and to the emitter of transistor 73. The collector of transistor 73 is grounded. The collector of load transistor 71 is coupled to regulator 65. The collector of transistor 72 is coupled to the base of transistor 73 and to a feedback network comprising transistors 76, 77 and 80. Capacitor 66 is also coupled to the collector of a transistor 81 which has its base coupled to the collector of transistor 75. The emitter of transistor 81 is coupled to the base of a transistor 82 which is coupled back via its collector to the collector of transistor 75.

A zener diode 83 has its cathode coupled to capacitor 66 and its anode coupled to the bases of two transistors 84 and 85, and via a resistor 86 to ground. The emitter of transistor 84 is coupled to the base of transistor 82 and the collector of transistor 84 is coupled back to the collectors of transistors 76 and 77.

The collector of transistor 85 is coupled to the bases of transistors 87 and 90 and to capacitor 66 via a resistor 88. Transistor 87 is coupled back to the base of transistor 76 and the collector of transistor 90 is coupled back to the base of transistor 85 via a resistor 91 and to capacitor 66 via a resistor 92.

When the receiver is first turned on, capacitor 66 begins to charge from the raw B+ supply via resistors 70 and 98. When the voltage on capacitor 66 is approximately equal to the base-emitter voltage of transistor 90, about 0.7 volts, transistors 87 and 90 will saturate. With transistors 87 and 90 saturated, current flow through resistor 91 will be shunted through the collector of transistor 90, essentially grounding the base of transistor 85. Operation of transistor 90 therefore shunts base current from transistor 85, thereby keeping transistor 85 off. Transistor 87, since it is saturated, keeps the base voltage of transistor 76 low, thereby keeping transistors 76, 77 and 80 off. Transistors 87 and 90 draw relatively little current, which loads capacitor 66 only slightly. By maintaining most of circuit 64 in an off state while capacitor 66 is charging, the operation of transistors 87 and 90 permit capacitor 66 to continue charging without appreciable circuit loading.

As the voltage on capacitor 66 increases, the zener voltage of diode 83 is reached and transistors 85 and 84 are turned on. This occurs, for example, at approximately 8.4 volts. With transistor 85 conducting, resistor 88 current is diverted away from transistors 87 and 90 to the collector of transistor 85. Transistors 87 and 90 are thereby turned off.

Transistor 84 supplies current to the base of transistor 73, which begins to conduct simultaneously with transistor 84. Conduction of transistor 73 turns on load transistor 71, and transistors 72, 74 and 75. Conduction of transistor 74 then turns on the feedback path comprising transistors 76, 77 and 80. Conduction of transistor 75 turns on transistors 81 and 82, thereby turning off transistor 84. Transistor 73 base current is now supplied by conduction of transistors 76 and 77. At this point power supply circuit 64 is fully operative. Transistors 71, 72, 74 and 75 act as current sources for load circuit 65 and other loads associated with supply 64. These other loads include, for example, npn transistor base drive current for receiver circuits such as oscillator 33 and pulse generator 41. These loads, coupled to the emitter of transistor 81 are designated by terminal 100.

Pnp transistor base drive current for other receiver circuitry is derived from the emitter of transistor 73. This load is designated by terminal 101. Injection current for I²L circuitry associated with receiver deflection circuits, derived from the emitter of transistor 80, also comprises a load, which is designated by terminal 102. With power supply circuit 64 operative, the receiver begins to operate, generating flyback pulses necessary to energize windings 60.

During this initial receiver operating period, circuit 64 is powered primarily from capacitor 66, which becomes discharged since circuit 64 draws more current (approximately 14 mA) than can be provided by the raw B+ supply via resistors 70 and 98. Because of the operation of transistors 87 and 90 which limit the initial loading of capacitor 66, capacitor 66 can charge sufficiently in order to power supply circuit 64 until regulator 61 becomes operative.

As capacitor 66 is discharged by circuit 64, diode 83 turns off when capacitor 66 voltage falls below the zener voltage of diode 83. Transistor 85 remains conductive, however, due to a supply of current through resistors 86, 91 and 92. The circuit 64 will continue to operate until the voltage on capacitor 66 falls below a lower holding voltage, for example 4 volts, which is insufficient to supply enough current through resistors 91 and 92 to maintain conduction of transistor 85. At this point, transistor 85 turns off. When transistor 85 turns off, however, transistors 87 and 90 will again saturate, turning off transistor 76 which will cause the current sources of circuit 64 to become inoperative. With transistors 87 and 90 again saturated, the previously described process will be repeated. Capacitor 66 may therefore be recharged as many times as are necessary until the receiver achieves normal operation.

The circuit previously described, therefore, will maintain power supply 64 essentially in an off condition with the load current sources disabled until capacitor 66 charges to a predetermined voltage level. Shunt regulator 97 and any load circuits will not become energized until capacitor 66 has been sufficiently charged. The current sources of circuit 64 then become operative and will remain operative even though the voltage on capacitor 66 falls below that predetermined level. They will remain operative until the capacitor voltage falls below a lower holding voltage. This lower holding voltage is intermediate or between the first start-up circuit turn on voltage and the second load energization voltage. The load current sources of power supply circuit 64 are then disabled and remain disabled until capacitor 66 is charged to the upper predetermined level. The circuit will continue to operate in this manner until the +24 volt supply begins to supply sufficient current to terminal 99.

What is claimed is:

1. In a television receiver having a power supply including a capacitor for energizing a television receiver load circuit, and a first current source for charging said capacitor upon the turning on of said television receiver, a power supply start-up circuit comprising:
    means for intially disabling said power supply upon turn-on of said television receiver to allow said capacitor to charge from said current source to a first voltage level;
    means responsive to the attainment of said first voltage level for enabling said power supply to energize said load circuit, said power supply when enabled drawing current from said capacitor;
    means responsive to the attainment of a second voltage level below said first voltage level for disabling said power supply when said capacitor discharges to said second voltage level to allow said capacitor to recharge from said first current source; and
    means responsive to the energization of said load circuit for providing a second current from said load circuit to charge said capacitor to develop a steady state voltage across said capacitor to prevent said capacitor from discharging to said second voltage level.

2. The arrangement defined in claim 1, wherein said load circuit comprises a horizontal deflection circuit for developing horizontal rate signals and including means responsive to said horizontal rate signals for developing said steady state voltage.

3. The arrangement defined in claim 1, wherein said means for establishing a first voltage level comprises transistor means coupled to said current source and wherein said first voltage level is determined by a base-emitter junction voltage established by said transistor means.

4. The arrangement defined in claim 1, wherein said means for disabling said power supply comprises first transistor means responsive to said first voltage level for conducting current, conduction of said first transistor means disabling said power supply.

5. The arrangement defined in claim 1, wherein said means for enabling said power supply comprises second transistor means responsive to said second voltage level for conducting current, conduction of said second transistor means disabling said power supply disabling means.

6. The arrangement defined in claim 5, wherein said second voltage level is determined by a zener diode.

7. The arrangement defined in claim 1, wherein said power supply comprises a plurality of controllable current sources each supplying current to a respective one of a plurality of loads within said load circuit, said plurality of current sources being coupled to said capacitor and wherein said start-up circuit is coupled to the control terminals of said current sources for controlling the operation of said current sources in response to the voltage level attained by said capacitor.

8. In a television receiver including a plurality of controllable supply current sources, a capacitor coupled to said controllable current sources and providing current thereto and an input current source for charging said capacitor upon turn-on of said receiver, a start-up circuit coupled to said plurality of controllable supply current sources and to said capacitor, comprising:
    first means responsive to the attainment of a first non-zero voltage level across said capacitor for applying a disabling signal to the control terminals of selective ones of said plurality of controllable supply current sources after turn-on of said television receiver to allow said capacitor to charge from said input current source to a second voltage level;
    second means responsive to the attainment of said second voltage level for disabling said first means to enable said plurality of supply current sources to draw current from said capacitor and discharge said capacitor; and
    third means responsive to a third voltage level below said second voltage level and above said first non-zero voltage level for reenabling said first means to allow said capacitor to recharge from said input current source.

9. The arrangement defined in claim 8, including a plurality of load circuits each being supplied with current from a respective one of said plurality of controllable supply current sources, and wherein one of said load circuits comprises a horizontal deflection circuit for developing horizontal rate signals and including means responsive to said horizontal rate signals for developing a steady state voltage across said capacitor.

10. The arrangement defined in claims 8 or 9, wherein said first means comprises first transistor means responsive to said receiver turn-on for conducting current, conduction of first transistor means disabling said controllable current sources.

11. The arrangement defined in claim 10, wherein said second means comprises second transistor means responsive to the attainment of said predetermined voltage level for conducting current, conduction of said second transistor means enabling said controllable current sources and disabling said first means.

* * * * *